United States Patent [19]

Hughes

[11] 4,316,387
[45] Feb. 23, 1982

[54] TRANSDUCER AND METHOD FOR PASSIVELY MEASURING THERMAL RADIATION FLUENCE

[76] Inventor: Peter S. Hughes, P.O. Box 278, Los Alamos, N. Mex. 87544

[21] Appl. No.: 78,236

[22] Filed: Sep. 24, 1979

[51] Int. Cl.³ .......................... G01K 17/00; G01J 5/00
[52] U.S. Cl. ................................................ 73/190 H
[58] Field of Search ........... 73/190 EW, 190 H, 15 R, 73/355 R; 250/472, 473

[56] References Cited

U.S. PATENT DOCUMENTS 3,569,995 3/1971 Mallon et al. ....................... 250/473
3,905,228 9/1975 Smith ..................................... 73/190

*Primary Examiner*—Herbert Goldstein
*Attorney, Agent, or Firm*—Allston L. Jones

[57] ABSTRACT

The invention herein is a method and apparatus for passively measuring and recording the thermal fluence from radiative heat sources. This is a non-electronic apparatus that includes a transducer whose sensing elements include a stack of thin sheets of stretched polystyrene. Each of the sheets of polystyrene are essentially opaque to infra-red radiation and upon exposure to a radiative heat source, soften and shrink as a function of the trapped bi-directional stresses within the sensing element material. These plastic elements integrate the time dependent thermal flux, i.e., they deform in direct proportion to the total incident fluence. This transducer is also direction dependent and has the ability to record the direction of the peak incident thermal fluence. Such a transducer is useful in mapping the incident heat input to large structures exposed to simulated nuclear and other types of intense thermal radiation.

9 Claims, 5 Drawing Figures

TRANSDUCER AND METHOD FOR PASSIVELY MEASURING THERMAL RADIATION FLUENCE

The Government may have rights in this invention pursuant to Contract Number DNA001-79-C-0092 awarded by Defense Nuclear Agency.

BACKGROUND AND SUMMARY OF THE INVENTION

This invention relates to instruments for measuring and recording the infra-red spectrum from heat sources, and, more particularly, to passive devices for measuring and recording the thermal fluence from radiative heat sources.

At present, these type of measurements are made with electronic calorimeters. These instruments require a calorimeter element wired to a preamplifier which in turn is wired to a tape recorder to make a permanent record of the measurements. The calorimeters normally used for this type of measurement, measure the thermal flux (time varying heating rate) from the radiation source and not the thermal fluence which is the data that is of paramount interest in most nuclear effects and other intense thermal radiation testing.

There are many other drawbacks to the use of the electronic instruments, not the least of which is the high cost of these instruments which, not unusually, run as high as $2,000 to $3,000 per recording channel. As a result of this high cost, only a small percentage of the desired locations on the item under test are normally instrumented to record the incident thermal radiation during a test. To make matters worse, frequently the signal-to-noise ratio of the output signal from the calorimeter is low, and in some cases so low that valid data is recovered by less than 50% of the recording channels. Additionally, data recovery is effected by a variety of failures such as broken wires, preamplifier failure, calorimeter burnout, and tape recorder saturation, not to mention the tedious calibration and checkout procedure necessary to ready these instruments for use in the tests.

It would be desirable to have a transducer for these applications that is less expensive than electronic calorimeters, more reliable, not limited by the electronics, small in size and can be used to map large surfaces such as aircraft structures to record the variations in the radiation incident on all parts of that structure, and one that provides quick, on the spot test results without the need for computer evaluation of the data from magnetic tape. The present invention disclosed herein presents such a transducer.

In accordance with the preferred embodiment, the transducer includes a selected number of polystyrene pieces each having a selected thickness and geometric shape for sensing thermal radiation fluence from radiative heat sources. These pieces are selectively stacked one on top of the other for providing at least partial thermal shielding from one layer of the stack to the next. Also included is fastening means for holding the pieces in position one with respect to the others.

The method of the preferred embodiment for measuring the thermal radiation fluence from a radative heat source comprises measuring selected dimensions of each of the pieces of the transducer after exposure to the radiative source. These measurements are then operated on mathematically to obtain a measure of the intensity of the fluence to which the transducer was exposed.

DESCRIPTION OF THE PREFERRED EMBODIMENT

The transducer of the present invention consists of a selected number of pieces of stretched polystyrene sheet cut into selected geometric shapes and placed in stacks in a selected manner. Details of this will be discussed below. Before going into the use of polystyrene for measuring thermal radiation fluence, some background of the characteristics of polystyrene is necessary.

The optical properties of sheet polystyrene are such that the transmission of electromagnetic energy across the visible spectrum is about 90%, thus it appears transparent to the human eye. However, these polystyrene sheets, which serve as the sensing elements for the invention, are relatively opaque to the shorter wavelengths (ultraviolet) and longer wavelengths (infrared) of light. There is a fairly sharp transmission cut off at wavelengths shorter than about $0.25\mu$ to $0.3\mu$. This effect is due to the absorption by the styrene monomer. Thus, a transducer having polystyrene elements could also be used to measure the incident energy in the ultraviolet spectrum from a radiative source. The transmission qualities of the polystyrene transducer elements over the near infra-red spectrum for 2 mil sheet stock is an average of roughly 50%.

Polystyrene has some additional properties that make it a good choice for a passive thermal radiation fluence transducer. These include:

(1) low moisture absorptivity; e.g. 0.03–0.04% in 24 hours;
(2) stable up to at least 150° F.; and
(3) very slight degradation experienced during prolonged exposure to sunlight.

If stretched polystyrene sheet stock is exposed to infra-red radiation it softens and partially shrinks back to its originally manufactured size. It is this characteristic together with its opacity to infra-red radiation that permits this material to be used as a passive thermal radiation fluence transducer; i.e., it absorbs the heat and decreases in size accordingly.

Figure 1:
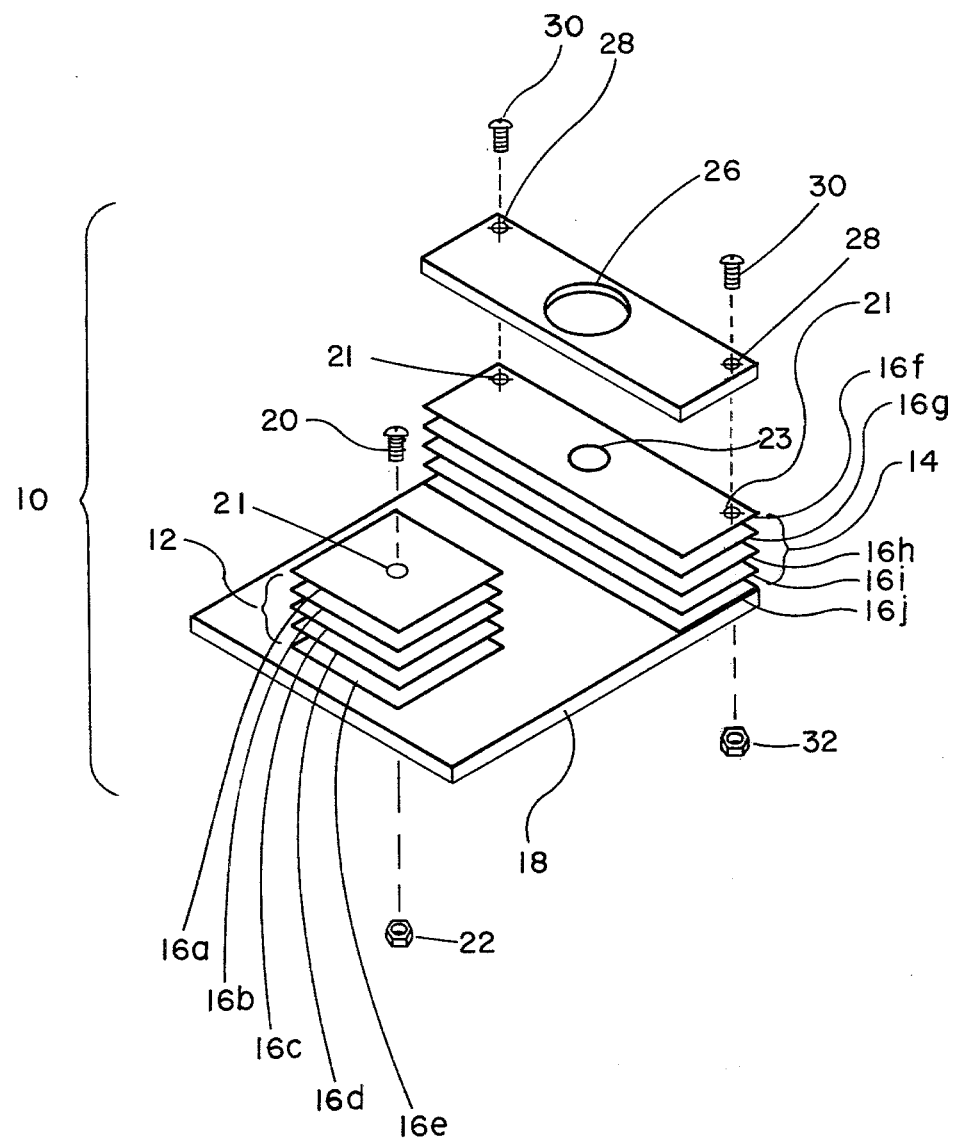
FIG. 1 is an exploded isometric view of a thermal transducer of the present invention.
Figure 2:
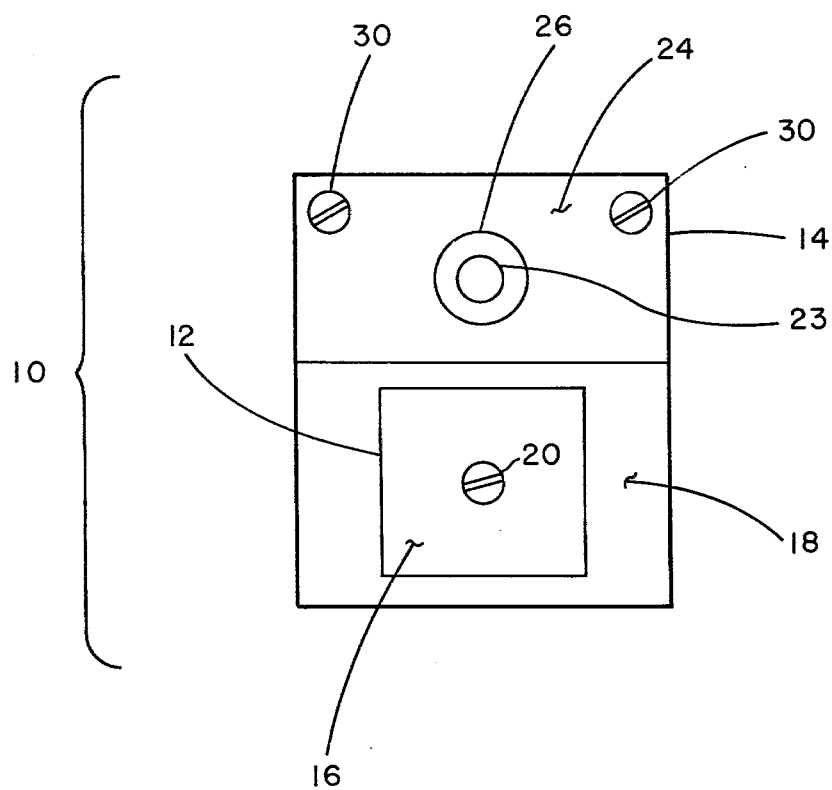
FIG. 2 is a top view of the same transducer as shown in FIG. 1.

In the embodiment of the present invention, as shown in FIGS. 1 and 2, there is a transducer 10 with thermal sensors 12 and 14. Each of thermal sensors 12 and 14, in this embodiment, includes five pieces 16 of bidirectionally stretched polystyrene each cut in a selected geometric shape and size, and then stacked one on top of the other. Both sensors 12 and 14 are then mounted on backing board 18 which is made of a material selected from those having low heat diffusivity and low reflectivity, e.g., asbestos.

Sensor 12 is completed by stacking the square cut pieces 16a–e of the sheet polystyrene by passing the shank portion of bolt 20 through center hole 21 of each of the polystyrene pieces 16a–e and through a predrilled hole in backing plate 18 and then affixing nut 22 to the end of the shank portion of bolt 20 as it extends through backing board 18. In this embodiment, the square cut pieces 16a–e are approximately one inch on each side.

Sensor 14 includes sheet polystyrene pieces 16f–g that are rectangularly cut each having three holes drilled therethrough. These pieces 16f–j are approximately three-quarters of an inch by two inches. One of the holes is approximately one-quarter inch in diameter and is drilled in the approximate center of the individual polystyrene rectangular pieces 16f–j. The other two smaller holes are drilled near the corners of the individual pieces 16f–j along one of the longest sides. The pieces are then stacked one on top of the other and a masking board 24 is then placed directly above the top 16f to form sensor 14 and to restrict the exposure of pieces 16f–j to only the area surrounding the central quarter-inch hole. Masking board 24 is typically made of the same insulating material as backing board 18. Mask 24 also includes a center hole 26 of approximately one-half inch in diameter having approximately the same center point as holes 23 in pieces 16f–j so that hole 26 is aligned with holes 23 when mask 24 is in place. In this configuration, a circle of polystyrene having an approximately uniform one-eighth of an inch width is exposed through hole 26. In addition, holes 28 are predrilled in mask 24 directly opposite holes 21 in polystyrene pieces 16f–j of sensor 14. The assembly of sensor 14 is thus completed by extending the shank portion of bolts 30 through holes 28 and 21 of mask 24 and polystyrene pieces 16f–j, respectively, from the top surface of transducer 10. The shanks of bolts 30 extend completely through mask piece 24 and polystyrene pieces 16f–j and backing board 18 and then nuts 32 are affixed to the shank portions of bolts 30 which extend through backing board 18.

Figure 4A:
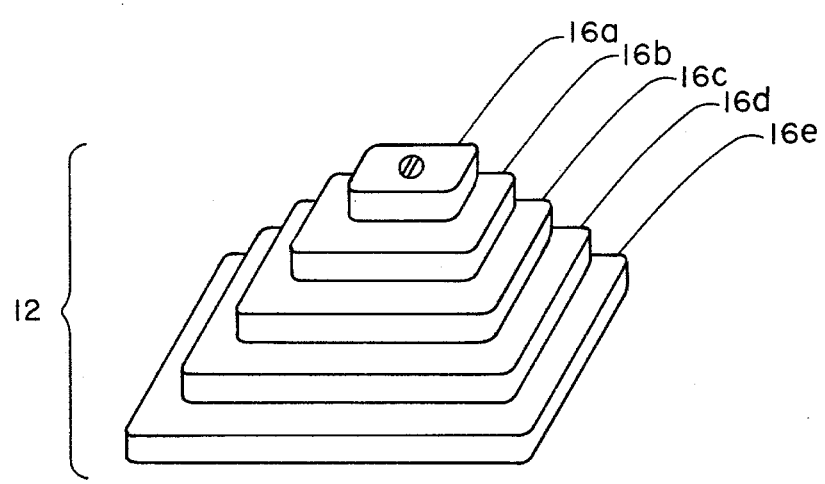
FIGS. 4a and 4b are exaggerated views of the appearance of sensors 12 and 14 of transducer 10 of FIGS. 1 and 2 after exposure to intense thermal radiation.

Sensor 12 responds to the incident thermal load (i.e., sensor 12 absorbs the time-dependent thermal radiation flux, e.g., infra-red wavelength, with pieces 16a–e integrating this flux and providing a recording of the total fluence incident on sensor 12) by each of pieces 16a–e by shrinking inward toward the center in petal fashion, i.e., the above piece 16 of polystyrene shrinks back further exposing the piece 16 below and, each in turn, depending on the intensity of the heat, shrinks back to a lesser degree as they are exposed from above as shown in an exaggerated view of FIG. 4a. The concept of this configuration is for the upper pieces 16 to shield the lower pieces 16 so that the successive pieces 16 deform to a lesser extent. Then following exposure to the thermal source, the deformation of each of pieces 16a–e can be measured to provide a quantitative measurement of the incident heat.

Figure 4B:
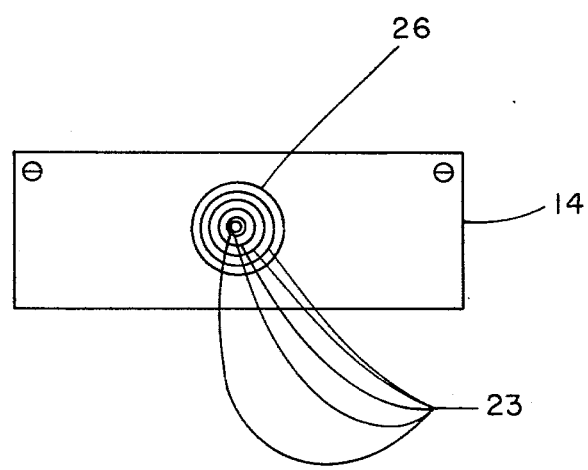

Sensor 14 responds in a similar fashion to that of sensor 12. In sensor 14 the central hole 23 in each of the various pieces 16f–j grows outward toward hole 26 in mask 24, in concentric rings as shown in an exaggerated view in FIG. 4b. In this configuration, the increase in diameter of the central hole 23 through each of polystyrene pieces 16f–j can be measured to provide a quantative measurement of the incident heat.

Through experimentation it has been noted that there are various factors involved in maximizing the dynamic range of transducer 10. These factors include the number of polystyrene pieces 16 used in each of the sensors, the thickness of each of these pieces, the geometric shape of the pieces, whether they are used to shrink inward to a central point such as in sensor 12, or whether they are used to shrink outward from a central hole as in sensor 14, etc. For the application that the embodiment shown herein was designed for, polystyrene stretched by a factor of 2.5 with a ±5% thickness variation and a balanced stress level in both X and Y directions of 80 psi/80 psi with a tolerance of ±5 psi in either direction, was selected. In this embodiment there are five polystyrene pieces 16 in each stack and each piece 16 of polystyrene is 0.010 inches thick. For other applications, transducer 10 could include polystyrene pieces 16 of a different thickness, different geometric shapes, and a different number of pieces 16 in each stack to match the dynamic range of the transducer to the particular application. Through experimentation with a transducer 10 having sensor 12 which includes 0.010 inches thick polystyrene pieces 16, five in number, each being about one inch square, as well as, sensor 14 utilizing the same number and thickness polystyrene pieces 16, it appears that the useful range of the device in that configuration is approximately 1 to 30 calories per square centimeter.

To determine the intensity of the radiation to which transducer 10 is exposed it is necessary to measure each of the polystyrene layers 16 of sensors 12 and 14. The individual measurements of each layer within each sensor are then algebraically combined to generate a calibration parameter. This calibration parameter is then used with a predetermined calibration curve for a sensor of that configuration size, number of polystyrene pieces 16, and original thickness of the individual polystyrene pieces 16.

Figure 3:
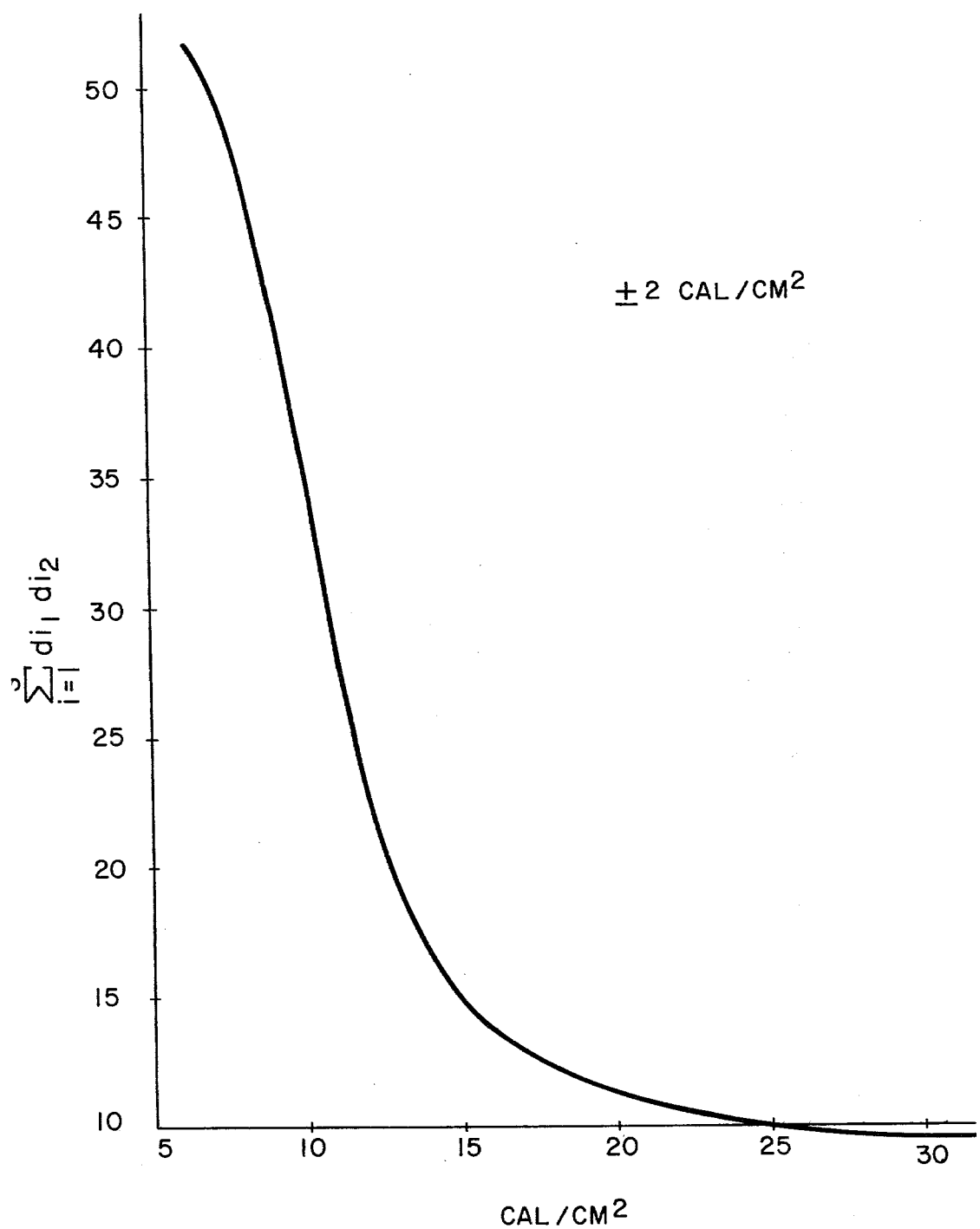
FIG. 3 is a sample calibration curve for a sensor 12 of the square type shown in FIGS. 1 and 2 as a part of transducer 10.

The algebraic combination of measurements in each layer of the sensor can be any convenient mathematical operation. The calibration curve shown in FIG. 3 is for a sensor 12 having five pieces 16 each being 0.010 inches thick and having the calibration parameter calculated by summing the products of the two after-exposure diagonal measurements of each of pieces 16. This calculation is demonstrated by equation 1.

$$\text{Calibration Parameter} = \sum_{i=1}^{5} d_{i1} d_{i2} \quad (1)$$

where $d_{i1}$ and $d_{i2}$ are the first and second diagonal lengths of polystyrene layers $16(i)$.

By experimentation, it has been determined that the calibration curve of FIG. 3 for sensor 12 constructed as described above has an accuracy of ±2 calories per square centimeter and it is believed that this can be improved to ±10% of the absolute radiation fluence incident on sensor 12.

Equation 1 is intended to be merely illustrative of the means of deriving a calibration parameter for use with a calibration curve. It should be understood that calibration curves can be derived for any number of polystyrene pieces 16 in the stack and for any thickness of the original material of each of pieces 16. Also, it should be understood that it is not necessary to limit the calibration parameter to a sum of the products of the diagonal distances across each layer after exposure to thermal radiation. The calibration parameter can be defined and calculated by any convenient means.

The calibration curve for sensor 14 is similar to the curve for sensor 12 and can be derived through experimentation or calculation. The calibration parameter can be defined and derived by any convenient algebraic operation that operates on any measurement or set of measurements with regard to the size of hole 23 through each of pieces 16 of sensor 14.

If transducer 10 is placed such that the top surface of sensors 12 and 14 are parallel to the wave front of the thermal radiation that is impingent upon them, each of the measurements taken on the various pieces 16 of each sensor will be approximately equal. However, if the thermal radiation is not perpendicular to the transducer, the angularity will be evident in the deformation of pieces 16. This results from the fact that transducer 10 also records the incident direction of the peak thermal fluence (i.e. the direction from which the heat was most intense for the longest period of time). When there is this variation in the measurements, it is possible to calculate the direction from which the radiation wave originated and thus map the thermal affect on a large body, such as an aircraft, when a large number of transducers 10 have been placed at selected locations over the contoured surface of that body, as well as, obtaining an accurate reading as to the radiation level impingent upon that portion of the body.

I claim:

1. A transducer for passively measuring the thermal radiation fluence from a radiative heat source, said transducer comprising:
    a selected number of stretched plastic pieces each having selected thicknesses and geometric shapes, said pieces having selected stress trapped therein and being selectively stacked one on top of the other for providing at least partial thermal shielding by the pieces above to the pieces below for sensing the thermal radiation fluence when exposed to the radiative heat source as recorded by the measurable geometric changes in said plastic pieces caused thereby; and
    fastening means for holding said pieces in position one with respect to the other.

2. A transducer as in claim 1 wherein said pieces each have the same thickness and geometric shape.

3. A transducer as in claim 2 wherein each of said pieces are square and each is stacked squarely one on top of the one below.

4. A transducer as in claim 3 wherein:
    said transducer further includes backing means having a low heat diffusivity and emissivity;
    each of said square pieces define a small substantially, centrally located hole therethrough; and
    said fastening means including a nut and bolt, the shank of said bolt extending through the centrally located hole in each of said pieces and through said backing means, and having the nut screwed onto the end of the bolt shank which extends through the backing means.

5. A transducer as in claim 2 wherein each of said pieces are rectangular, define a centrally located hole therethrough having a diameter that is substantially equal to one-third the narrowest dimension of the rectangular shape, with each of said piece being stacked square on top of the one below.

6. A transducer as in claim 5 wherein said transducer further includes:
    backing means having a low heat diffusivity and reflectivity upon which said pieces are stacked; and
    masking means having a low heat diffusivity and reflectivity, being substantially the same size and shape as said pieces, and defining a centrally located hole therethrough having a diameter substantially equal to one-half the narrowest dimension of said masking means, said masking means for placement squarely over the top piece with the central hole of the masking means being substantially concentric with the central holes in each of said pieces.

7. A method for passively measuring thermal radiation fluence from a radiative heat source, the method comprising the steps of:
    a. fabricating a selected number of pieces of selectively stretched plastic each having selected stress trapped therein, and a selected thickness and geometric shape for sensing the thermal radiation fluence from the radiative heat source;
    b. selectively stacking said selected pieces one on top of the other for providing at least partial thermal shielding by the pieces above to the pieces below;
    c. fastening said selected pieces one to the other in said stacked position to prevent slippage during exposure to thermal radiation to allow the pieces to shrink when exposed to said radiation;
    d. exposing the fastened pieces to the thermal radiation source for which the fluence measurement is desired;
    e. measuring selected dimensions of each piece after exposure to said thermal radiation; and
    f. mathematically obtaining a measure of the intensity of the thermal radiation fluence to which the pieces were exposed from the measurements of step e.

8. A method as in claim 7 wherein the step of fabricating includes cutting the pieces into substantially the same geometric shapes each having substantially the same thickness as each other piece.

9. A method as in claim 8 wherein the step of stacking includes the stacking of each piece square one on top of the other.

* * * * *